United States Patent
Qi et al.

(10) Patent No.: US 10,256,923 B2
(45) Date of Patent: Apr. 9, 2019

(54) METHOD AND DEVICE FOR GENERATING MIMO TEST SIGNAL

(71) Applicant: GENERAL TEST SYSTEMS INC., Shenzhen, Guangdong (CN)

(72) Inventors: Yihong Qi, Guangdong (CN); Wei Yu, Guangdong (CN); Penghui Shen, Guangdong (CN)

(73) Assignee: GENERAL TEST SYSTEMS INC., Shenzhen, Guangdong (CN)

(*) Notice: Subject to any disclaimer, the term of this patent is extended or adjusted under 35 U.S.C. 154(b) by 0 days.

(21) Appl. No.: 15/915,667

(22) Filed: Mar. 8, 2018

(65) Prior Publication Data

US 2018/0262281 A1   Sep. 13, 2018

(30) Foreign Application Priority Data

Mar. 8, 2017  (CN) .......................... 2017 1 0134624

(51) Int. Cl.
| | | |
|---|---|---|
| *H04L 27/00* | (2006.01) | |
| *H04B 17/12* | (2015.01) | |
| *H04B 17/309* | (2015.01) | |
| *H04B 17/15* | (2015.01) | |
| *H04B 7/0456* | (2017.01) | |
| *H04B 7/0413* | (2017.01) | |
| *H04B 17/391* | (2015.01) | |

(52) U.S. Cl.
CPC .......... *H04B 17/12* (2015.01); *H04B 7/0413* (2013.01); *H04B 7/0456* (2013.01); *H04B 17/15* (2015.01); *H04B 17/309* (2015.01); *H04B 17/391* (2015.01); *H04L 2027/0024* (2013.01)

(58) Field of Classification Search
USPC .......................................... 375/267; 370/329
See application file for complete search history.

(56) References Cited

U.S. PATENT DOCUMENTS

| | | | | |
|---|---|---|---|---|
| 8,744,133 B1* | 6/2014 | Troy | ....................... | G06T 7/001 |
| | | | | 382/106 |
| 2003/0223630 A1* | 12/2003 | Adel | ....................... | G03F 7/705 |
| | | | | 382/145 |
| 2015/0350002 A1* | 12/2015 | Jiao | ....................... | H04B 7/0604 |
| | | | | 455/41.2 |
| 2016/0119909 A1* | 4/2016 | Fukuzono | ............. | H04W 16/28 |
| | | | | 370/329 |
| 2017/0331537 A1* | 11/2017 | Jiao | ....................... | H04B 7/0456 |

* cited by examiner

*Primary Examiner* — Eva Y Puente
(74) *Attorney, Agent, or Firm* — David D. Brush; Westman, Champlin & Koehler, P.A.

(57) ABSTRACT

Provided are a method and a device for generating a MIMO test signal which is configured to test a performance of MIMO wireless terminal. With the method, the plurality of space propagation matrixes of the MIMO testing system are acquired by performing the phase shift transformation on the plurality of calibration matrixes of the MIMO testing system, the target space propagation matrix having the isolation degree meeting the preset condition is determined according to the maximum amplitude value of elements in each inverse matrix of the plurality of space propagation matrixes, and the transmitting signal for test is generated by a calculation according to the throughput testing signal acquired by the pre-calculation and the target calibration matrix corresponding to the target space propagation matrix.

20 Claims, 3 Drawing Sheets

Fig. 1 performing a phase shift transformation for a plurality of calibration matrixes of the MIMO testing system to acquire a plurality of space propagation matrixes of the MIMO testing system correspondingly — 101 determining a target space propagation matrix having an isolation degree meeting a preset condition according to a maximum amplitude value of elements in each inverse matrix of the plurality of space propagation matrixes — 102 generating the transmitting signal for the test by a calculation according to a throughput testing signal acquired by a pre-calculation and a target calibration matrix corresponding to the target space propagation matrix — 103

METHOD AND DEVICE FOR GENERATING MIMO TEST SIGNAL

CROSS-REFERENCE TO RELATED APPLICATIONS

This application claims priority to and benefits of Chinese Patent Application Serial No. 201710134624.6 filed with the State Intellectual Property Office of P. R. China on Mar. 8, 2017, the entire content of which is incorporated herein by reference.

FIELD

The present disclosure relates to the field of wireless communication testing technology, and more particularly to a method and a device for generating a multiple-input multiple-output (MIMO) test signal which is configured to test a performance of a MIMO wireless terminal.

BACKGROUND

An object of a test of an over the air (OTA) technology of the MIMO antenna is to guarantee that test results from labs can really reflect wireless performances of a wireless terminal in a variety of complex and practical environments and in use states.

The main MIMO wireless terminal test methods provided by 3rd Generation Partnership Project (3GPP), an international wireless standard organization, include a multi-probe anechoic chamber (MPAC) method, a radiated two-stage (RTS) method and a reverberation chamber method. Specifically, the RTS method is based on a conducted two-stage method but not involving conducting wires. With the RTS method, a signal is transmitted to a device under test (DUT) in free space simulated by an anechoic chamber, and an inverse matrix of a space propagation matrix is demodulated with a corresponding method. In such a manner, two virtual conducting wires may be achieved in the space and the signal may be transmitted to a receiver via the virtual conducting wires.

Figure 1:
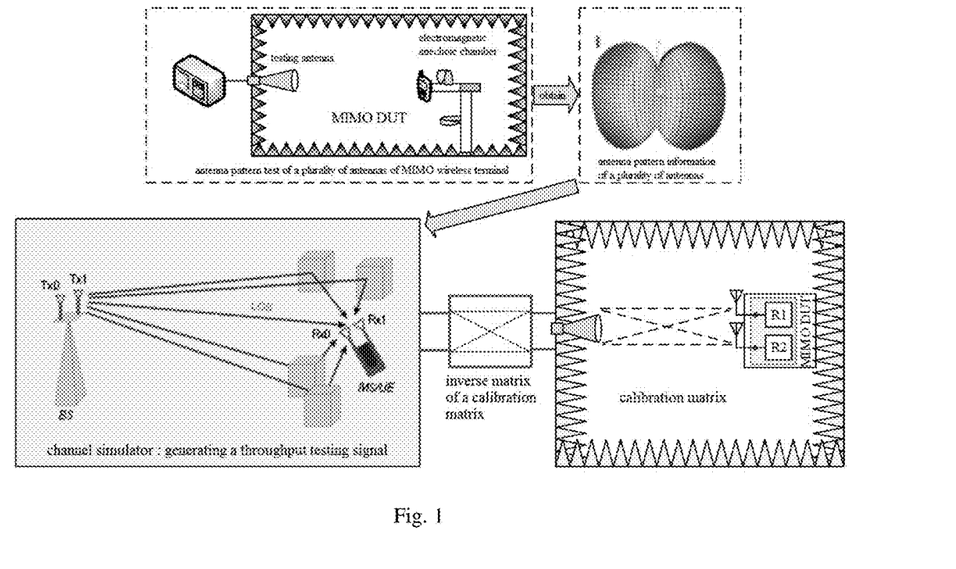
FIG. 1 is a schematic diagram of an RTS method in the related art.

In order to make the RTS method more readily appreciated, the RTS method of the MIMO wireless terminal test is introduced briefly below with reference to FIG. 1, which is a schematic diagram of an RTS method in the related art, and a test process thereof mainly includes the following steps:

step A, obtaining antenna pattern information of a plurality of antennas of a MIMO wireless terminal (i.e., a DUT), in which the antenna pattern information contains gain information in a plurality of directions of each antenna and phase shift information of any two antennas receiving the same signal in a plurality of directions, and the like;

step B, simulating a complete MIMO transmission channel by fusing the antenna pattern information of the plurality of antennas of the DUT obtained and a preset MIMO channel propagation model so as to further generate a throughput testing signal;

step C, determining a calibration matrix for the DUT in an anechoic chamber according to relative positions and directions of the DUT to a testing antenna in the anechoic chamber, and generating a transmitting signal for test according to the calibration matrix and the throughput testing signal obtained; and step D, feeding the transmitting signal for test into a plurality of testing antennas of the electromagnetic anechoic chamber and transmitting the transmitting signal to the MIMO wireless terminal through the testing antennas so as to test the wireless terminal.

In step C, the transmitting signal for test is generated according to the calibration matrix, and the calibration matrix herein reflects an amplitude shift and a phase shift in a signal transmission from the testing antenna to the receiving antenna of the MIMO wireless terminal. Since not all the calibration matrixes have an inverse matrix, different calibration matrixes needs to be achieved by changing the relative position and/or orientation between the DUT and the testing antenna of the MIMO system. Furthermore, in the related art, for any of the calibration matrixes with a certain relative position and/or orientation between the DUT and the testing antenna, an isolation degree of the MIMO system needs to be measured. Subsequently, a matrix having a maximum isolation degree is selected for generating the transmitting signal for test.

With such method for measuring the isolation degree in the related art, a lot of time needs to be spent since there may be a plurality of relative position and/or orientation between the DUT and the testing antenna, particularly in a case of high-order calibration matrixes. Moreover, efficiency for solving the isolation degree is low due to human intervention in the testing process, as it needs a tester to subjectively determine whether the isolation degree meets requirements or not. Because of the low efficiency for solving the isolation degree in the related art, a long time is needed in determining a space propagation matrix according to the isolation degree, and further in generating the transmitting signal for test according to the space propagation matrix determined, thus negatively affecting an efficiency for generating the transmitting signal for test seriously and resulting in a low testing efficiency.

SUMMARY

The present disclosure seeks to solve at least one of the problems that exist in the related art to at least some extent.

Accordingly, a first object of the present disclosure is to provide a method for generating a MIMO test signal, which aims at solving a technical problem of low efficiency for generating a transmitting signal for test in the related art.

A second object of the present disclosure is to provide a device for generating a MIMO test signal.

In order to achieve above objects, in a first aspect of embodiments of the present disclosure, a method for generating a MIMO test signal is provided, in which the signal is a transmitting signal for test and configured to test a performance of a MIMO wireless terminal in a MIMO testing system, the method includes:

performing a phase shift transformation for a plurality of calibration matrixes of the MIMO testing system to acquire a plurality of space propagation matrixes of the MIMO testing system correspondingly;

determining a target space propagation matrix having an isolation degree meeting a preset condition according to a maximum amplitude value of elements in each inverse matrix of the plurality of space propagation matrixes; and generating the transmitting signal for test by a calculation according to a throughput testing signal acquired by a pre-calculation and a target calibration matrix corresponding to the target space propagation matrix.

In order to achieve above objects, in a second aspect of embodiments of the present disclosure, a device for generating a MIMO test signal is provided. The device is configured to perform the method for generating a MIMO test signal according to the first aspect of embodiments of the present disclosure, in which the signal is a transmitting signal for test and is configured to test a performance of a MIMO wireless terminal in a MIMO testing system.

In order to achieve above objects, in a third aspect of embodiments of the present disclosure, a device for generating a MIMO test signal is provided, the device includes: a processor; and a memory for storing instructions executable by the processor; in which the processor is configured to perform the method for generating a MIMO test signal according to the first aspect of embodiments of the present disclosure, in which the signal is a transmitting signal for test and is configured to test a performance of a MIMO wireless terminal in a MIMO testing system.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In embodiments of a first aspect of the present disclosure, there is provided a method for generating a multiple-input multiple-output MIMO test signal, in which the signal is a transmitting signal for test and configured to test a performance of a MIMO wireless terminal in a MIMO testing system, the method includes:

performing a phase shift transformation for a plurality of calibration matrixes of the MIMO testing system to acquire a plurality of space propagation matrixes of the MIMO testing system correspondingly;

determining a target space propagation matrix having an isolation degree meeting a preset condition according to a maximum amplitude value of elements in each inverse matrix of the plurality of space propagation matrixes; and generating the transmitting signal for test by a calculation according to a throughput testing signal acquired by a pre-calculation and a target calibration matrix corresponding to the target space propagation matrix.

In embodiments of the present disclosure, determining a target space propagation matrix having an isolation degree meeting a preset condition according to a maximum amplitude value of elements in each inverse matrix of the plurality of space propagation matrixes includes:

solving the inverse matrix for each space propagation matrix being a non-singular matrix in the plurality of space propagation matrixes; and determining the target space propagation matrix having the isolation degree meeting the preset condition from the space propagation matrixes being the non-singular matrix according to the maximum amplitude value of elements in the inverse matrix of each space propagation matrix being the non-singular matrix.

In embodiments of the present disclosure, performing a phase shift transformation for a plurality of calibration matrixes of the MIMO testing system to acquire a plurality of space propagation matrixes of the MIMO testing system correspondingly includes:

changing a relative position or orientation or both the relative position and orientation between the MIMO wireless terminal and a testing antenna of the MIMO testing system for a plurality of times to acquire the plurality of calibration matrixes of the MIMO testing system; and performing the phase shift transformation for each calibration matrix to acquire the space propagation matrix, in which a phase shift of a first column parameter of the space propagation matrix is zero.

In embodiments of the present disclosure, performing the phase shift transformation for each calibration matrix to acquire the space propagation matrix includes:

performing the phase shift transformation for a calibration matrix $$A = \begin{bmatrix} A_{11}e^{j(\phi_{11})} & A_{21}e^{j(\phi_{11}+\gamma_{21})} & \cdots & A_{N1}e^{j(\phi_{11}+\gamma_{N1})} \\ A_{12}e^{j(\phi_{12})} & A_{22}e^{j(\phi_{12}+\gamma_{22})} & \cdots & A_{N2}e^{j(\phi_{12}+\gamma_{N2})} \\ \vdots & \vdots & \ddots & \vdots \\ A_{1N}e^{j(\phi_{1N})} & A_{2N}e^{j(\phi_{1N}+\gamma_{2N})} & \cdots & A_{NN}e^{j(\phi_{1N}+\gamma_{NN})} \end{bmatrix}$$

according to a formula of $$A = \begin{bmatrix} e^{j(\varphi_{11})} & 0 & \cdots & 0 \\ 0 & e^{j(\varphi_{12})} & \cdots & 0 \\ \vdots & \vdots & \ddots & \vdots \\ 0 & 0 & \cdots & e^{j(\varphi_{1N})} \end{bmatrix} * \\ \begin{bmatrix} A_{11}e^{j(0)} & A_{21}e^{j(\gamma_{21})} & \cdots & A_{N1}e^{j(\gamma_{N1})} \\ A_{12}e^{j(0)} & A_{22}e^{j(\gamma_{22})} & \cdots & A_{N2}e^{j(\gamma_{N2})} \\ \vdots & \vdots & \ddots & \vdots \\ A_{1N}e^{j(0)} & A_{2N}e^{j(\gamma_{2N})} & \cdots & A_{NN}e^{j(\gamma_{NN})} \end{bmatrix}$$

to acquire a space propagation matrix $$A^M = \begin{bmatrix} A_{11}e^{j(0)} & A_{21}e^{j(\gamma_{21})} & \cdots & A_{N1}e^{j(\gamma_{N1})} \\ A_{12}e^{j(0)} & A_{22}e^{j(\gamma_{22})} & \cdots & A_{N2}e^{j(\gamma_{N2})} \\ \vdots & \vdots & \ddots & \vdots \\ A_{1N}e^{j(0)} & A_{2N}e^{j(\gamma_{2N})} & \cdots & A_{NN}e^{j(\gamma_{NN})} \end{bmatrix},$$

where $A_{xy}$ represents an amplitude shift between a $y^{th}$ testing antenna and an $x^{th}$ receiver, acquired according to antenna pattern information;

$\gamma_{xy}$ represents a phase shift between a signal received by the $x^{th}$ receiver and a signal received by a first receiver when the $y^{th}$ testing antenna is used as a transmitting source; and $\varphi_{1y}$ represents a phase shift between a signal transmitted from the $y^{th}$ testing antenna and a signal received by the first receiver.

In embodiments of the present disclosure, generating the transmitting signal for test by a calculation according to a throughput testing signal acquired by a pre-calculation and a target calibration matrix corresponding to the target space propagation matrix includes:

determining the target calibration matrix corresponding to the target space propagation matrix; and acquiring the transmitting signal for test by multiplying the throughput testing signal by an inverse matrix of the target calibration matrix.

In embodiments of the present disclosure, solving the inverse matrix for each space propagation matrix being a non-singular matrix in the plurality of space propagation matrixes includes:

solving an inverse matrix $B^M$ of a space propagation matrix $A^M$ if the space propagation matrix $A^M$ is the non-singular matrix.

In embodiments of the present disclosure, determining a target space propagation matrix having an isolation degree meeting a preset condition according to a maximum amplitude value of elements in each inverse matrix of the plurality of space propagation matrixes includes:

determining a maximum amplitude value $B_m$ of elements in the inverse matrix $B^M$ of the space propagation matrix $A^M$; and determining the target space propagation matrix having the isolation degree meeting the preset condition based on a positive correlation between an isolation degree A_Iso of the space propagation matrix $A^M$ and $$\frac{1}{B_m}.$$

In embodiments of the present disclosure, after the transmitting signal for test is acquired, the method further includes:

feeding the transmitting signal for test into a plurality of testing antennas of the MIMO testing system and transmitting the transmitting signal for test to the MIMO wireless terminal via the testing antennas to test the performance of the MIMO wireless terminal.

In embodiments of the present disclosure, an order of the space propagation matrix is greater than or equal to 2.

In embodiments of the present disclosure, the preset condition includes a maximum isolation degree or an isolation degree greater than or equal to a preset isolation degree threshold.

In embodiments of a second aspect of the present disclosure, a device for generating a MIMO test signal is provided. The device is configured to perform the method for generating a MIMO test signal according to the first aspect of embodiments of the present disclosure, in which the signal is a transmitting signal for test and is configured to test a performance of a MIMO wireless terminal in a MIMO testing system.

In embodiments of a third aspect of the present disclosure, a device for generating a MIMO test signal is provided, the device includes: a processor; and a memory for storing instructions executable by the processor; in which the processor is configured to perform the method for generating a MIMO test signal according to the first aspect of embodiments of the present disclosure, in which the signal is a transmitting signal for test and is configured to test a performance of a MIMO wireless terminal in a MIMO testing system.

Method and device for generating a MIMO test signal according to embodiments of the present disclosure are described below in detail with reference to drawings, and are configured to test performances of a DUT, i.e., a MIMO wireless terminal.

Figure 2:
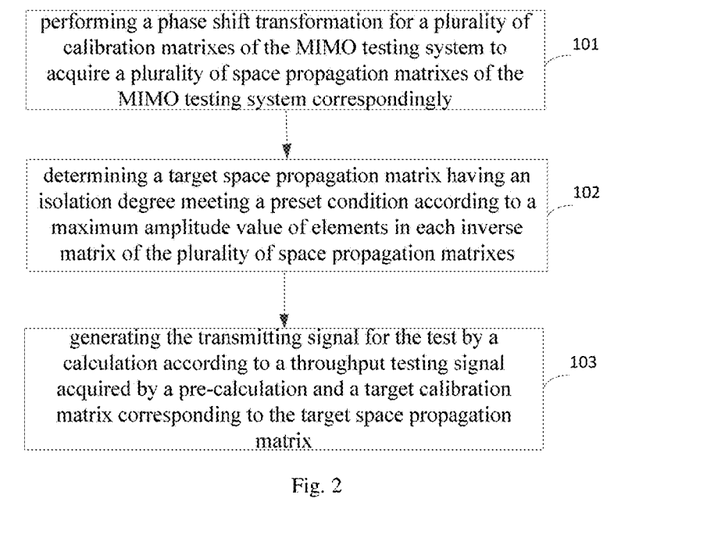
FIG. 2 is a flowchart of a method for generating a MIMO test signal according to an embodiment of the present disclosure.

FIG. 2 is a flowchart of a method for generating a MIMO test signal according to an embodiment of the present disclosure.

When a transmitting signal for test is generated according to a calibration matrix in an RTS method, calculation of the transmitting signal for test is related to an inverse matrix of the calibration matrix. For example, in a system that the number of testing antennas is two and the number of receiving antennas of the MIMO wireless terminal is two the transmitting signals $$\begin{bmatrix} MT1 \\ MT2 \end{bmatrix}$$

for test and throughput testing signals $$\begin{bmatrix} S1 \\ S2 \end{bmatrix}$$

meet a formula of $$\begin{bmatrix} MT1 \\ MT2 \end{bmatrix} = \begin{bmatrix} a11 & a12 \\ a21 & a22 \end{bmatrix}^{-1} \begin{bmatrix} S1 \\ S2 \end{bmatrix},$$

in which $$\begin{bmatrix} a11 & a12 \\ a21 & a22 \end{bmatrix}^{-1}$$

is the inverse matrix of the calibration matrix. The calibration matrix is configured to indicate the change of the electromagnetic wave in the space transmission, the value of the calibration matrix is not only related to environment of an anechoic chamber, but also to position and polarization of the antenna selected for transmitting signal for test and a position of the DUT, and combinations of these variables will result in a large number of calibration matrixes. Since existence of an inverse matrix for a calibration matrix depends on a certain condition, solving inverse matrix cannot be performed on some calibration matrixes. In the related art, in order to select a suitable calibration matrix, the inverse matrix of each possible calibration matrix should be checked sequentially or randomly to see if it meets requirements. Such an approach is extremely time-consuming and inefficient, and it is common that an inverse matrix meeting requirements is not encountered after a few hours or longer. More importantly, a tester must follow throughout the test and make subjective judgments on performance of each solved inverse matrix. Therefore, pervasive application of the RTS method is hindered.

With respect to such a problem, a method for generating a MIMO test signal is provided in an embodiment of the present disclosure, which aims at solving a technical problem of low efficiency for generating the transmitting signal for test in the related art. As shown in FIG. 2, the method includes actions illustrated at the following blocks.

At block 101, a phase shift transformation is performed for a plurality of calibration matrixes of the MIMO testing system to acquire a plurality of space propagation matrixes of the MIMO testing system.

Specifically, in the MIMO testing system, when a relative position and/or orientation between the MIMO wireless terminal (i.e., a DUT) and a testing antenna is changed, the calibration matrix changes accordingly. Therefore, the plurality of calibration matrixes are acquired by changing the relative position and/or orientation for a plurality of times. The phase shift transformation is performed for each calibration matrix to acquire the space propagation matrix, and a phase shift of a first column parameter of the space propagation matrix is zero.

At block 102, a target space propagation matrix having an isolation degree meeting a preset condition is determined according to a maximum amplitude value of elements in each inverse matrix of the plurality of space propagation matrixes.

Specifically, the inverse matrix is calculated for each space propagation matrix being a non-singular matrix in the plurality of space propagation matrixes. The target space propagation matrix having the isolation degree meeting the preset condition is determined from the space propagation matrixes being the non-singular matrix according to the maximum amplitude value of elements in the inverse matrix of each space propagation matrix being the non-singular matrix. In an example of the present disclosure, the preset condition includes a maximum isolation degree or an isolation degree greater than or equal to a preset isolation degree threshold, for example, the preset isolation degree threshold is 6 dB. In an example of the present disclosure, the space propagation matrix having a maximum isolation degree is determined as the target space propagation matrix. In an example of the present disclosure, if a space propagation matrix $A^M$ is a non-singular matrix, an inverse matrix $B^M$ of the space propagation matrix $A^M$ is solved. Further, a maximum amplitude value $B_m$ of elements in the inverse matrix $B^M$ of the space propagation matrix $A^M$ is determined. The target space propagation matrix having the isolation degree meeting the preset condition is determined based on a positive correlation between an isolation degree A_Iso of the space propagation matrix $A^M$ and $$\frac{1}{B_m}.$$

At block 103, the transmitting signal for test is generated by a calculation according to a throughput testing signal acquired by a pre-calculation and a target calibration matrix corresponding to the target space propagation matrix.

Specifically, the target calibration matrix corresponding to the target space propagation matrix is determined. The throughput testing signal is multiplied by an inverse matrix of the target calibration matrix to acquire the transmitting signal for test.

Further, after the transmitting signal for test is generated, the transmitting signal for test may be fed into a plurality of testing antennas of the MIMO testing system and transmitted to the MIMO wireless terminal via the testing antennas to test the performance of the MIMO wireless terminal.

In this embodiment of the present disclosure, the plurality of space propagation matrixes of the MIMO testing system are acquired by performing the phase shift transformation on the plurality of calibration matrixes of the MIMO testing system, the target space propagation matrix having the isolation degree meeting the preset condition is determined according to the maximum amplitude value of elements in each inverse matrix of the plurality of space propagation matrixes, and the transmitting signal for test is generated by a calculation according to the throughput testing signal acquired by the pre-calculation and the target calibration matrix corresponding to the target space propagation matrix. Since the target space propagation matrix having the isolation degree meeting the preset condition may be determined just by calculation, efficiency for generating signal may be improved, and calculation speed may be increased especially in a high-order space propagation matrix, thus facilitating intelligentization, automation and optimization of the RTS method.

The method according to above embodiment of the present disclosure is suitable for two-order and high-order space propagation matrixes, and is more advantageous especially in the high-order application. For more clearly, detailed description will be made below in combination with an M×N MIMO system.

Figure 3:
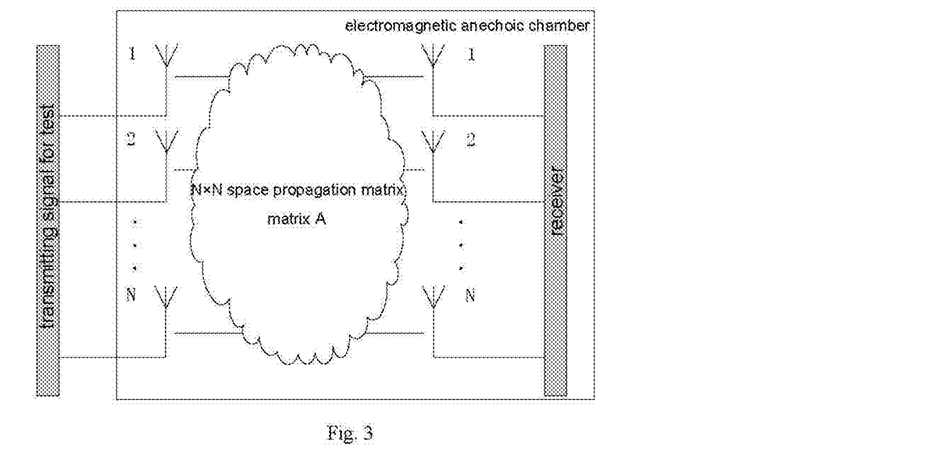
FIG. 3 is a schematic diagram for illustrating a testing process according to an embodiment of the present disclosure.

For the M×N MIMO system, a testing process of the RTS method may be illustrated by FIG. 3. As shown in FIG. 3, transmitting signals for test are transmitted by N testing antennas and then received by N receiving antennas, such a process corresponds to an N×N space propagation square matrix (matrix A for short) in mathematics. The matrix A includes information about such as gain and phase shift of the testing antennas, space path loss and phase shift, and gain and phase shift of the receiving antennas. Therefore, the matrix A may be influenced by a relative position and/or orientation between the DUT and the testing antennas. The matrix A may be expressed as follows.

$$A = \begin{bmatrix} a_{11} & a_{21} & \cdots & a_{N1} \\ a_{12} & a_{22} & \cdots & a_{N2} \\ \vdots & \vdots & \ddots & \vdots \\ a_{1N} & a_{2N} & \cdots & a_{NN} \end{bmatrix},$$

where $a_{xy}$ (x=1, 2, ..., N; y=1, 2, ..., N) represents an amplitude shift and a phase shift of a signal transmitting from a transmitting port of a $y^{th}$ testing antenna to a receiving port of an $x^{th}$ receiving antenna.

In the practice test of the RTS method, an inverse matrix needs to be solved for the matrix A. Since the matrix A is related to factors such as relative position and/or orientation between the DUT and the testing antennas, a number of equations of the matrix A may be achieved. For performing the inverse matrix solution and the RTS test, a "suitable" matrix A should be determined. In the related art, a method of determining a "suitable" matrix is provided, which is particularly based on the isolation degree.

For better understanding, the isolation degree is described in detail below. In mathematics, if the matrix A has an inverse matrix B, $$B = \begin{bmatrix} b_{11} & b_{21} & \cdots & b_{N1} \\ b_{12} & b_{22} & \cdots & b_{N2} \\ \vdots & \vdots & \ddots & \vdots \\ b_{1N} & b_{2N} & \cdots & b_{NN} \end{bmatrix},$$

matrixes A and B meet a formula of $$\begin{bmatrix} b_{11} & b_{21} & \cdots & b_{N1} \\ b_{12} & b_{22} & \cdots & b_{N2} \\ \vdots & \vdots & \ddots & \vdots \\ b_{1N} & b_{2N} & \cdots & b_{NN} \end{bmatrix} * \begin{bmatrix} a_{11} & a_{21} & \cdots & a_{N1} \\ a_{12} & a_{22} & \cdots & a_{N2} \\ \vdots & \vdots & \ddots & \vdots \\ a_{1N} & a_{2N} & \cdots & a_{NN} \end{bmatrix} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

In physics, above formula means that the throughput testing signal reaches a receiver after multiplied by matrixes A and B, which equivalents to that the throughput testing signal is fed into the receiver without cross coupling.

Figure 4:
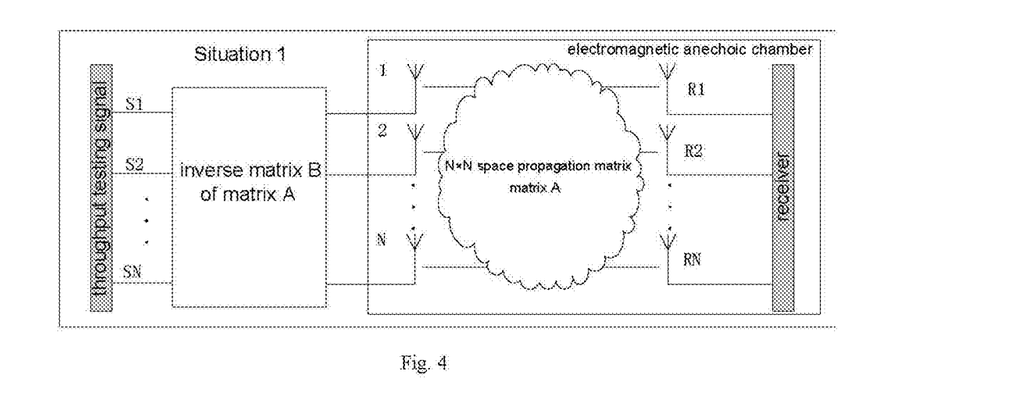
FIG. 4 is a schematic diagram for illustrating a signal transmitting process according to an embodiment of the present disclosure.
Figure 5:
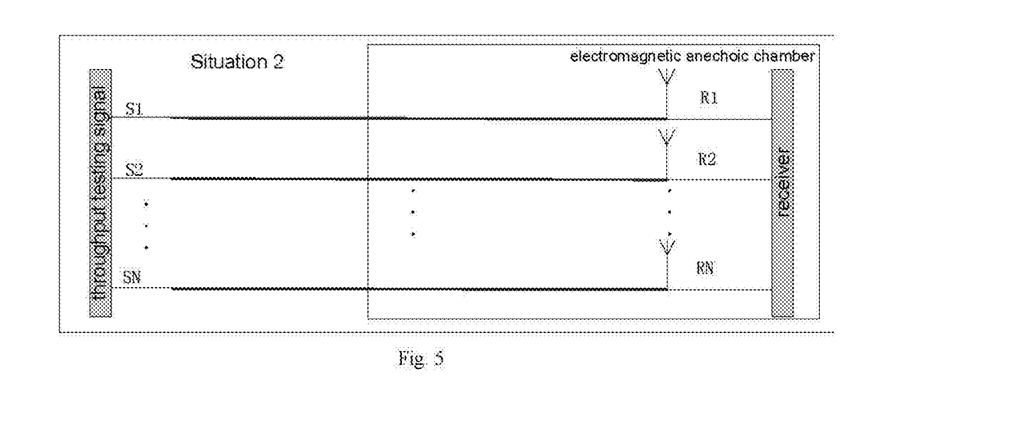
FIG. 5 is a schematic diagram for illustrating a signal transmitting process according to another embodiment of the present disclosure.

FIGS. 4 and 5 are described for clarity, in which FIG. 4 is a schematic diagram for illustrating a signal transmitting process according to an embodiment of the present disclosure and FIG. 5 is a schematic diagram for illustrating a signal transmitting process according to another embodiment of the present disclosure. In a case as shown in FIG. 4, the inverse matrix of the matrix A is used in the RTS method, such that as shown in FIG. 5, the throughput testing signals $[S_1 \, S_2 \, \ldots \, S_N]$ are directly fed into the receiver to acquire signals $[R_1 \, R_2 \, \ldots \, R_N]$. In such a process, each signal suffers no interference or coupling, i.e., realizing $$\begin{bmatrix} R_1 \\ R_2 \\ \vdots \\ R_N \end{bmatrix} = \begin{bmatrix} S_1 \\ S_2 \\ \vdots \\ S_N \end{bmatrix},$$

which means an $i^{th}$ (i=1, 2, . . . , N) receiver only receives an $i^{th}$ (i=1, 2, . . . , N) throughput testing signal.

Figure 6:
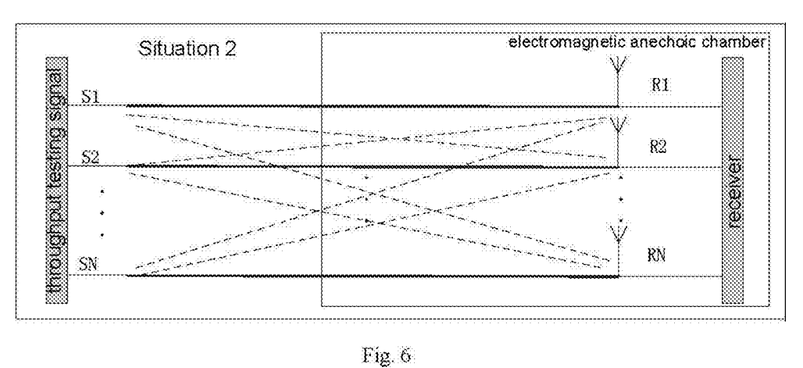
FIG. 6 is a schematic diagram for illustrating a signal transmitting process according to a further embodiment of the present disclosure.

Above description is in an ideal condition. In a practical engineering application, for reasons of noise, reflection, broadband, etc, besides the $i^{th}$ (i=1, 2, . . . , N) throughput testing signal, interference noises from other paths may also be received by the $i^{th}$ (i=1, 2, . . . , N) receiver. FIG. 6 is a schematic diagram for illustrating a signal transmitting process according to a further embodiment of the present disclosure. As shown in FIG. 6, dashed lines indicate an interference situation of signals in different paths.

In order to measure the interference, an isolation degree is defined herein. The isolation degree of the $i^{th}$ (i=1, 2, . . . , N) receiver is defined by subtracting a power of other path interference received by the $i^{th}$ (i=1, 2, . . . , N) receiver from a power of the $i^{th}$ (i=1, 2, . . . , N) throughput testing signal received by the $i^{th}$ (i=1, 2, . . . , N) receiver. Therefore, for the MIMO wireless terminal having N receivers, there are N isolation degrees, named [$Iso_1 \, Iso_2 \, \ldots \, Iso_N$], and an isolation degree A_Iso of a matrix A, i.e., the isolation degree of the calibration matrix in the aforementioned embodiments, is defined as A_Iso=min ($Iso_1, Iso_2, \ldots, Iso_N$).

In an embodiment of the present disclosure, a matrix having A_Iso greater than a preset isolation degree threshold (which may be determined according to practical requirements, for example, 6 dB) may be used as the "suitable" matrix. Matrix A having a maximum A_Iso in the "suitable" matrixes may be used as an "optimum" matrix, which has a smallest interference among paths.

However, in the related art, testing and verifying one by one is the only manner that can be used, especially for N-order inverse matrix solution, where N≥3. The specific approach is as follows. The relative orientation between the DUT and the testing antennas is changed, which could be achieved such as by a turnable. Conditions with different orientation are subjected to calculation until the matrix A having an isolation degree which meets the requirements is acquired, and then the inverse matrix solution is performed. Such an approach is especially complicated for solving high-order inverse matrixes, and there are many conditions, the test is time-consuming, which basically takes at least an hour or more, and the time of the test may increase as the order increase. To make matters more complicated, the solution requires human intervention and the operator has to subjectively determine whether the isolation degree meets the requirements. Therefore, the approach needs a lot of time and labour.

Specifically, the "optimum" matrix A, i.e., the target calibration matrix in aforementioned embodiments is determined as follows. In a first step of the RTS method, antenna pattern information of the DUT is tested, and the antenna pattern information contains gain information of each antenna and phase shift information of any two antennas receiving the same transmitting signal for test. As shown in FIG. 3, in the transmitting process between the transmitting signals for test and the receivers, matrix A represents the transmission between the transmitting signals for test and the receivers, and may be expressed as:

$$A = \begin{bmatrix} A_{11}e^{j(\varphi_{11})} & A_{21}e^{j(\varphi_{11}+\gamma_{21})} & \cdots & A_{N1}e^{j(\varphi_{11}+\gamma_{N1})} \\ A_{12}e^{j(\varphi_{12})} & A_{22}e^{j(\varphi_{12}+\gamma_{22})} & \cdots & A_{N2}e^{j(\varphi_{12}+\gamma_{N2})} \\ \vdots & \vdots & \ddots & \vdots \\ A_{1N}e^{j(\varphi_{1N})} & A_{2N}e^{j(\varphi_{1N}+\gamma_{2N})} & \cdots & A_{NN}e^{j(\varphi_{1N}+\gamma_{NN})} \end{bmatrix},$$

where $A_{xy}$ represents an amplitude shift between a $y^{th}$ testing antenna and an $x^{th}$ receiver (x=1, 2, . . . , N; y=1, 2, . . . , N), which is a known number, and may be acquired from the antenna pattern information; $e^{j(\varphi_{1y})}$ (x=1) or $e^{j(\varphi_{1y}+\gamma_{xy})}$ (x=2, 3, . . . , N) represents a phase shift between the $y^{th}$ testing antenna and the $x^{th}$ receiver, and for a transmitting signal, the phase shift between any two receivers is known and may also be acquired from the antenna pattern information; $\gamma_{xy}$ represents a phase shift between a signal received by the $x^{th}$ receiver and a signal received by a first receiver when the $y^{th}$ testing antenna is used as a transmitting source, and is a known number (please note that when x=1, there is no such phase shift, i.e., when x=1, $\gamma_{xy}$=0); and $\varphi_{1y}$ represents a phase shift between a transmitting signal of the $y^{th}$ testing antenna and a signal received by the first receiver, and is an unknown number. Therefore, the N×N matrix includes N unknown phase parameters.

Before the "optimum" matrix A is determined according to the isolation degree, the matrix A is subjected to the phase shift transformation according to the following matrix algorithm to acquire a space propagation matrix $A^M$, such that the unknown number $\varphi_{1y}$ can be removed, and the phase shift of a first column parameter of $A^M$ is zero, $$A = \begin{bmatrix} e^{j(\varphi_{11})} & 0 & \cdots & 0 \\ 0 & e^{j(\varphi_{12})} & \cdots & 0 \\ \vdots & \vdots & \ddots & \vdots \\ 0 & 0 & \cdots & e^{j(\varphi_{1N})} \end{bmatrix} *$$

$$\begin{bmatrix} A_{11}e^{j(0)} & A_{21}e^{j(\gamma_{21})} & \cdots & A_{N1}e^{j(\gamma_{N1})} \\ A_{12}e^{j(0)} & A_{22}e^{j(\gamma_{22})} & \cdots & A_{N2}e^{j(\gamma_{N2})} \\ \vdots & \vdots & \ddots & \vdots \\ A_{1N}e^{j(0)} & A_{2N}e^{j(\gamma_{2N})} & \cdots & A_{NN}e^{j(\gamma_{NN})} \end{bmatrix}$$

where $\begin{bmatrix} e^{j(\varphi_{11})} & 0 & \cdots & 0 \\ 0 & e^{j(\varphi_{12})} & \cdots & 0 \\ \vdots & \vdots & \ddots & \vdots \\ 0 & 0 & \cdots & e^{j(\varphi_{1N})} \end{bmatrix}$ is configured to transform the phase shift, and it can be acquired based on the above formula that $$A^M = \begin{bmatrix} A_{11}e^{j(0)} & A_{21}e^{j(\gamma_{21})} & \cdots & A_{N1}e^{j(\gamma_{N1})} \\ A_{12}e^{j(0)} & A_{22}e^{j(\gamma_{22})} & \cdots & A_{N2}e^{j(\gamma_{N2})} \\ \vdots & \vdots & \ddots & \vdots \\ A_{1N}e^{j(0)} & A_{2N}e^{j(\gamma_{2N})} & \cdots & A_{NN}e^{j(\gamma_{NN})} \end{bmatrix}.$$

Since the isolation degree is obtained by calculation of power, the transformation of the phase shift has no effect on the calculation. Matrix $A^M$, i.e., a space propagation matrix, is acquired from the matrix A, i.e., the calibration matrix, via the transformation of the phase shift.

It is determined that whether the matrix $A^M$ is a singular matrix. If the matrix $A^M$ is a singular matrix, there is no inverse matrix, and the isolation degree A_Iso of the matrix A can be recorded as negative infinity. If the matrix $A^M$ is a non-singular matrix, an invert matrix $B^M$ of the matrix $A^M$ is solved.

A maximum amplitude value of elements in the matrix $B^M$ is determined and recorded as $B_m$. Based on a positive correlation between the isolation degree A_Iso of the matrix A and $$\frac{1}{B_m},$$

isolation degrees of the matrix $A^M$ and the matrix A corresponding to the matrix $B^M$ having the maximum $$\frac{1}{B_m}$$

are also maximums.

Accordingly, the determination of the "optimum" matrix A and the solution of its inverse matrix can be realized in only a few minutes, thus saving time and labor and being of great value for the application of the RTS method.

It should be noted that, theoretically, as long as the matrix $A^M$ is not a singular matrix, a matrix $B^M$ being the inverse matrix of the matrix $A^M$ can always be determined, which meets the condition that the matrix $A^M$ is multiplied by the matrix $B^M$ to acquire an identity matrix. In this case, when the transmitting signal for test is received by a corresponding receiver, power shift doubles. In practice, phase and amplitude shifts need to be achieved in an instrument (or a radio frequency module), and magnification times (indicated as K) of a radio frequency circuit is limited, therefore, the maximum amplitude value of all the elements in $B^M$ cannot exceed K. As described above, the maximum amplitude value of $B^M$ calculated in mathematics is recorded as $B_m$. In practice, all the elements in the $B^M$ needs to be multiplied by $$\frac{K}{B_m},$$

and a product of multiplying a matrix $$\frac{K}{B_m} * B^M$$

by $A^M$ is $$\frac{K}{B_m} * I,$$

where I is the identity matrix. The actual situation under this case is that, when the transmitting signal for test is received by the corresponding receiver, power shifts $$\frac{K}{B_m}$$

times. Accordingly, in practice, the smaller $B_m$ is, the greater the isolation degree A_Iso of the corresponding matrix A is. Therefore, there is a positive correlation relationship between the isolation degree A_Iso of the matrix A and $$\frac{1}{B_m}.$$

In embodiments of the present disclosure, a device for generating a MIMO test signal is provided. The device is configured to perform the method for generating a MIMO test signal as described in embodiments hereinbefore, in which the signal is a transmitting signal for test and is configured to test a performance of a MIMO wireless terminal in a MIMO testing system.

In embodiments of the present disclosure, the plurality of space propagation matrixes of the MIMO testing system are acquired by performing the phase shift transformation on the plurality of calibration matrixes of the MIMO testing system, the inverse matrix is calculated for each space propagation matrix being the non-singular matrix in the plurality of space propagation matrixes, the target space propagation matrix having the isolation degree meeting the preset condition is further determined from the space propagation matrixes being the non-singular matrix according to the maximum amplitude value of elements in the inverse matrix of each space propagation matrix being the non-singular matrix, and the transmitting signal for test is generated by a calculation according to the throughput testing signal acquired by the pre-calculation and the target calibration matrix corresponding to the target space propagation matrix. Since the target space propagation matrix having the isolation degree meeting the preset condition may be determined just by calculation, efficiency for generating signal may be improved, and calculation speed may be increased especially in a high-order space propagation matrix, thus facilitating intelligentization, automation and optimization of the RTS method.

It should be noted that descriptions and explanations described in aforementioned embodiments with respect to the method are also applicable to the device in these embodiments, and will not be elaborated herein.

In embodiments of the present disclosure, a device for generating a MIMO test signal is provided, the device includes: a processor; and a memory for storing instructions executable by the processor; in which the processor is configured to perform the method for generating a MIMO test signal as described in aforementioned embodiments, in which the signal is a transmitting signal for test and is configured to test a performance of a MIMO wireless terminal in a MIMO testing system.

It should be noted that descriptions and explanations described in aforementioned embodiments with respect to the method are also applicable to the device in these embodiments, and will not be elaborated herein.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, a phrase of "a plurality of" means two or more than two, such as two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications may be made in the embodiments without departing from spirit, principles and scope of the present disclosure.

What is claimed is:

1. A method for generating a multiple-input multiple-output MIMO test signal, wherein the signal is a transmitting signal for test and configured to test a performance of a MIMO wireless terminal in a MIMO testing system, the method comprises:
    performing a phase shift transformation for a plurality of calibration matrixes of the MIMO testing system to acquire a plurality of space propagation matrixes of the MIMO testing system correspondingly;
    determining a target space propagation matrix having an isolation degree meeting a preset condition according to a maximum amplitude value of elements in each inverse matrix of the plurality of space propagation matrixes; and
    generating the transmitting signal for test by a calculation according to a throughput testing signal acquired by a pre-calculation and a target calibration matrix corresponding to the target space propagation matrix.

2. The method according to claim 1, wherein determining a target space propagation matrix having an isolation degree meeting a preset condition according to a maximum amplitude value of elements in each inverse matrix of the plurality of space propagation matrixes comprises:
    solving the inverse matrix for each space propagation matrix being a non-singular matrix in the plurality of space propagation matrixes; and
    determining the target space propagation matrix having the isolation degree meeting the preset condition from the space propagation matrixes being the non-singular matrix according to the maximum amplitude value of elements in the inverse matrix of each space propagation matrix being the non-singular matrix.

3. The method according to claim 1, wherein performing a phase shift transformation for a plurality of calibration matrixes of the MIMO testing system to acquire a plurality of space propagation matrixes of the MIMO testing system correspondingly comprises:

changing a relative position or orientation or both the relative position and orientation between the MIMO wireless terminal and a testing antenna of the MIMO testing system for a plurality of times to acquire the plurality of calibration matrixes of the MIMO testing system; and performing the phase shift transformation for each calibration matrix to acquire the space propagation matrix, in which a phase shift of a first column parameter of the space propagation matrix is zero.

4. The method according to claim 3, wherein performing the phase shift transformation for each calibration matrix to acquire the space propagation matrix comprises:

performing the phase shift transformation for a calibration matrix $$A = \begin{bmatrix} A_{11}e^{j(\varphi_{11})} & A_{21}e^{j(\varphi_{11}+\gamma_{21})} & \ldots & A_{N1}e^{j(\varphi_{11}+\gamma_{N1})} \\ A_{12}e^{j(\varphi_{12})} & A_{22}e^{j(\varphi_{12}+\gamma_{22})} & \ldots & A_{N2}e^{j(\varphi_{12}+\gamma_{N2})} \\ \vdots & \vdots & \ddots & \vdots \\ A_{1N}e^{j(\varphi_{1N})} & A_{2N}e^{j(\varphi_{1N}+\gamma_{2N})} & \ldots & A_{NN}e^{j(\varphi_{1N}+\gamma_{NN})} \end{bmatrix}$$

according to a formula of $$A = \begin{bmatrix} e^{j(\varphi_{11})} & 0 & \ldots & 0 \\ 0 & e^{j(\varphi_{12})} & \ldots & 0 \\ \vdots & \vdots & \ddots & \vdots \\ 0 & 0 & \ldots & e^{j(\varphi_{1N})} \end{bmatrix} * \begin{bmatrix} A_{11}e^{j(0)} & A_{21}e^{j(\gamma_{21})} & \ldots & A_{N1}e^{j(\gamma_{N1})} \\ A_{12}e^{j(0)} & A_{22}e^{j(\gamma_{22})} & \ldots & A_{N2}e^{j(\gamma_{N2})} \\ \vdots & \vdots & \ddots & \vdots \\ A_{1N}e^{j(0)} & A_{2N}e^{j(\gamma_{2N})} & \ldots & A_{NN}e^{j(\gamma_{NN})} \end{bmatrix}$$

to acquire a space propagation matrix $$A^M = \begin{bmatrix} A_{11}e^{j(0)} & A_{21}e^{j(\gamma_{21})} & \ldots & A_{N1}e^{j(\gamma_{N1})} \\ A_{12}e^{j(0)} & A_{22}e^{j(\gamma_{22})} & \ldots & A_{N2}e^{j(\gamma_{N2})} \\ \vdots & \vdots & \ddots & \vdots \\ A_{1N}e^{j(0)} & A_{2N}e^{j(\gamma_{2N})} & \ldots & A_{NN}e^{j(\gamma_{NN})} \end{bmatrix},$$

where $A_{xy}$ represents an amplitude shift between a $y^{th}$ testing antenna and an $x^{th}$ receiver, acquired according to antenna pattern information;

$\gamma_{xy}$ represents a phase shift between a signal received by the $x^{th}$ receiver and a signal received by a first receiver when the $y^{th}$ testing antenna is used as a transmitting source; and $\varphi_{1,y}$ represents a phase shift between a signal transmitted from the $y^{th}$ testing antenna and a signal received by the first receiver.

5. The method according to claim 1, wherein generating the transmitting signal for test by a calculation according to a throughput testing signal acquired by a pre-calculation and a target calibration matrix corresponding to the target space propagation matrix comprises:

determining the target calibration matrix corresponding to the target space propagation matrix; and acquiring the transmitting signal for test by multiplying the throughput testing signal by an inverse matrix of the target calibration matrix.

6. The method according to claim 2, wherein solving the inverse matrix for each space propagation matrix being a non-singular matrix in the plurality of space propagation matrixes comprises:

solving an inverse matrix $B^M$ of a space propagation matrix $A^M$ if the space propagation matrix $A^M$ is the non-singular matrix.

7. The method according to claim 6, wherein determining a target space propagation matrix having an isolation degree meeting a preset condition according to a maximum amplitude value of elements in each inverse matrix of the plurality of space propagation matrixes comprises:

determining a maximum amplitude value $B_m$ of elements in the inverse matrix $B^M$ of the space propagation matrix $A^M$; and determining the target space propagation matrix having the isolation degree meeting the preset condition based on a positive correlation between an isolation degree A_Iso of the space propagation matrix $A^M$ and $$\frac{1}{B_m}.$$

8. The method according to claim 1, wherein after the transmitting signal for test is acquired, the method further comprises:

feeding the transmitting signal for test into a plurality of testing antennas of the MIMO testing system and transmitting the transmitting signal for test to the MIMO wireless terminal via the testing antennas to test the performance of the MIMO wireless terminal.

9. The method according to claim 1, wherein an order of the space propagation matrix is greater than or equal to 2.

10. The method according to claim 1, wherein the preset condition comprises a maximum isolation degree or an isolation degree greater than or equal to a preset isolation degree threshold.

11. A device for generating a MIMO test signal, wherein the signal is a transmitting signal for test and configured to test a performance of a MIMO wireless terminal in a MIMO testing system, the device is configured to:

perform a phase shift transformation for a plurality of calibration matrixes of the MIMO testing system to acquire a plurality of space propagation matrixes of the MIMO testing system correspondingly;

determine a target space propagation matrix having an isolation degree meeting a preset condition according to a maximum amplitude value of elements in each inverse matrix of the plurality of space propagation matrixes; and generate the transmitting signal for test by a calculation according to a throughput testing signal acquired by a pre-calculation and a target calibration matrix corresponding to the target space propagation matrix.

12. A device for generating a MIMO test signal, comprising:

a processor; and a memory for storing instructions executable by the processor;

wherein the signal is a transmitting signal for test and configured to test a performance of a MIMO wireless terminal in a MIMO testing system, the processor is configured to:

perform a phase shift transformation for a plurality of calibration matrixes of the MIMO testing system to acquire a plurality of space propagation matrixes of the MIMO testing system correspondingly;

determine a target space propagation matrix having an isolation degree meeting a preset condition according to a maximum amplitude value of elements in each inverse matrix of the plurality of space propagation matrixes; and generate the transmitting signal for test by a calculation according to a throughput testing signal acquired by a pre-calculation and a target calibration matrix corresponding to the target space propagation matrix.

13. The device according to claim 12, wherein the processor determines a target space propagation matrix having an isolation degree meeting a preset condition according to a maximum amplitude value of elements in each inverse matrix of the plurality of space propagation matrixes by:

solving the inverse matrix for each space propagation matrix being a non-singular matrix in the plurality of space propagation matrixes; and determining the target space propagation matrix having the isolation degree meeting the preset condition from the space propagation matrixes being the non-singular matrix according to the maximum amplitude value of elements in the inverse matrix of each space propagation matrix being the non-singular matrix.

14. The device according to claim 12, wherein the processor performs a phase shift transformation for a plurality of calibration matrixes of the MIMO testing system to acquire a plurality of space propagation matrixes of the MIMO testing system correspondingly by:

changing a relative position or orientation or both the relative position and orientation between the MIMO wireless terminal and a testing antenna of the MIMO testing system for a plurality of times to acquire the plurality of calibration matrixes of the MIMO testing system; and performing the phase shift transformation for each calibration matrix to acquire the space propagation matrix, in which a phase shift of a first column parameter of the space propagation matrix is zero.

15. The device according to claim 14, wherein performing the phase shift transformation for each calibration matrix to acquire the space propagation matrix comprises:

performing the phase shift transformation for a calibration matrix $$A = \begin{bmatrix} A_{11}e^{j(\varphi_{11})} & A_{21}e^{j(\varphi_{11}+\gamma_{21})} & \cdots & A_{N1}e^{j(\varphi_{11}+\gamma_{N1})} \\ A_{12}e^{j(\varphi_{12})} & A_{22}e^{j(\varphi_{12}+\gamma_{22})} & \cdots & A_{N2}e^{j(\varphi_{12}+\gamma_{N2})} \\ \vdots & \vdots & \ddots & \vdots \\ A_{1N}e^{j(\varphi_{1N})} & A_{2N}e^{j(\varphi_{1N}+\gamma_{2N})} & \cdots & A_{NN}e^{j(\varphi_{1N}+\gamma_{NN})} \end{bmatrix}$$

according to a formula of $$A = \begin{bmatrix} e^{j(\varphi_{11})} & 0 & \cdots & 0 \\ 0 & e^{j(\varphi_{12})} & \cdots & 0 \\ \vdots & \vdots & \ddots & \vdots \\ 0 & 0 & \cdots & e^{j(\varphi_{1N})} \end{bmatrix} *$$

$$\begin{bmatrix} A_{11}e^{j(0)} & A_{21}e^{j(\gamma_{21})} & \cdots & A_{N1}e^{j(\gamma_{N1})} \\ A_{12}e^{j(0)} & A_{22}e^{j(\gamma_{22})} & \cdots & A_{N2}e^{j(\gamma_{N2})} \\ \vdots & \vdots & \ddots & \vdots \\ A_{1N}e^{j(0)} & A_{2N}e^{j(\gamma_{2N})} & \cdots & A_{NN}e^{j(\gamma_{NN})} \end{bmatrix}$$

to acquire a space propagation matrix $$A^M = \begin{bmatrix} A_{11}e^{j(0)} & A_{21}e^{j(\gamma_{21})} & \cdots & A_{N1}e^{j(\gamma_{N1})} \\ A_{12}e^{j(0)} & A_{22}e^{j(\gamma_{22})} & \cdots & A_{N2}e^{j(\gamma_{N2})} \\ \vdots & \vdots & \ddots & \vdots \\ A_{1N}e^{j(0)} & A_{2N}e^{j(\gamma_{2N})} & \cdots & A_{NN}e^{j(\gamma_{NN})} \end{bmatrix},$$

where $A_{xy}$ represents an amplitude shift between a $y^{th}$ testing antenna and an $x^{th}$ receiver, acquired according to antenna pattern information;

$\gamma_{xy}$ represents a phase shift between a signal received by the $x^{th}$ receiver and a signal received by a first receiver when the $y^{th}$ testing antenna is used as a transmitting source; and $\varphi_{1y}$ represents a phase shift between a signal transmitted from the $y^{th}$ testing antenna and a signal received by the first receiver.

16. The device according to claim 12, wherein the processor generates the transmitting signal for test by a calculation according to a throughput testing signal acquired by a pre-calculation and a target calibration matrix corresponding to the target space propagation matrix by:

determining the target calibration matrix corresponding to the target space propagation matrix; and acquiring the transmitting signal for test by multiplying the throughput testing signal by an inverse matrix of the target calibration matrix.

17. The device according to claim 13, wherein solving the inverse matrix for each space propagation matrix being a non-singular matrix in the plurality of space propagation matrixes comprises:

solving an inverse matrix $B^M$ of a space propagation matrix $A^M$ if the space propagation matrix $A^M$ is the non-singular matrix.

18. The device according to claim 17, wherein the processor determines a target space propagation matrix having an isolation degree meeting a preset condition according to a maximum amplitude value of elements in each inverse matrix of the plurality of space propagation matrixes by:

determining a maximum amplitude value $B_m$ of elements in the inverse matrix $B^M$ of the space propagation matrix $A^M$; and determining the target space propagation matrix having the isolation degree meeting the preset condition based on a positive correlation between an isolation degree A_Iso of the space propagation matrix $A^M$ and $$\frac{1}{B_m}.$$

19. The device according to claim 12, wherein after the transmitting signal for test is acquired, the processor is further configured to:

feed the transmitting signal for test into a plurality of testing antennas of the MIMO testing system and transmit the transmitting signal for test to the MIMO wireless terminal via the testing antennas to test the performance of the MIMO wireless terminal.

20. The device according to claim 12, wherein the preset condition comprises a maximum isolation degree or an isolation degree greater than or equal to a preset isolation degree threshold.

* * * * *